United States Patent
Kairali et al.

(10) Patent No.: US 12,513,210 B2
(45) Date of Patent: Dec. 30, 2025

(54) INTELLIGENT DATA MOVEMENT FOR DATA RESIDENCY RESTRICTIONS

(71) Applicant: International Business Machines Corporation, Armonk, NY (US)

(72) Inventors: Sudheesh S. Kairali, Kozhikode (IN); Shanmukha Sai Ram Pavan Parvathina, Dublin (IE); Sudhanshu Sekher Sar, Bangalore (IN); Satyam Jakkula, Bengaluru (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 18/491,480

(22) Filed: Oct. 20, 2023

(65) Prior Publication Data

US 2025/0133135 A1    Apr. 24, 2025

(51) Int. Cl.
*H04L 67/1097*    (2022.01)
*H04W 12/64*    (2021.01)

(52) U.S. Cl.
CPC ......... *H04L 67/1097* (2013.01); *H04W 12/64* (2021.01)

(58) Field of Classification Search
CPC .................... H04L 67/1097; H04W 12/64
See application file for complete search history.

(56) References Cited

U.S. PATENT DOCUMENTS

| | | |
|---|---|---|
| 8,447,732 B2 | 5/2013 | Nagpal et al. |
| 2011/0219360 A1 | 9/2011 | Srinivasa et al. |
| 2015/0363294 A1 | 12/2015 | Carback, III et al. |
| 2016/0378993 A1 | 12/2016 | McGee et al. |
| 2022/0400368 A1* | 12/2022 | Karia ................. H04M 15/48 |
| 2023/0036623 A1 | 2/2023 | Todasco et al. |
| 2023/0096158 A1 | 3/2023 | Rudden et al. |
| 2023/0262740 A1* | 8/2023 | Kleinrouweler ...... H04W 72/04 370/329 |

(Continued)

OTHER PUBLICATIONS

Author Unknown, "Managing data locations in a cloud," An IP.com Prior Art Database, May 13, 2013, accessed Aug. 2, 2023, https://priorart.ip.com/IPCOM/000227725.

(Continued)

*Primary Examiner* — Viet D Vu
(74) *Attorney, Agent, or Firm* — Yee & Associates, P.C.

(57) ABSTRACT

A computer implemented method for managing data in a mobile computing device. A number of processor units determine a geographic location of a mobile computing device. The number of processor units predict a predicted data residency issue with meeting data residency requirements for data stored in the mobile computing device based on the geographic location of the mobile computing device and a set of movement patterns for the mobile computing device. The number of processor units identify a number of recipient devices that meet the data residency requirements for moving the data from the mobile computing device to the number of recipient devices in response to predicting the predicted data residency issue. The number of processor units move the data to the number of recipient devices from the mobile computing device in response to identifying the number of recipient devices.

20 Claims, 11 Drawing Sheets

(56) References Cited

U.S. PATENT DOCUMENTS

2023/0316445 A1* 10/2023 Mesde ............... G06F 16/2365 705/325

OTHER PUBLICATIONS

Author Unknown, "Secure and Smart Routing of Security Posture Based on Sensitivity of Findings and Risk of Connections in Edge Computing via Intelligent Handshakes," An IP.com Prior Art Database, Mar. 19, 2022, accessed Aug. 2, 2023, https://priorart.ip.com/IPCOM/000269073.

Author Unknown, "Smart Vulnerability Fix in Edge Computing Based on Far Edge Mobility Pattern and Nearness," An IP.com Prior Art Database, Apr. 25, 2022, accessed Aug. 2, 2023.

Kamal, "Data Residency Compliance with Distributed CloudApproach—CPO Magazine," 3 pages, accessed Aug. 2, 2023, https://www.cpomagazine.com/data-protection/data-residency-compliance-with-distributed-cloud-approach/.

Lin et al, "Dynamic service migration in ultra-dense multi-access edge computing network for high-mobility scenarios," J Wireless Com Network, 2020, 29 pages, accessed Aug. 2, 2023, https://jwcn-eurasipjournals.springeropen.com/articles/10.1186/s13638-020-01805-2.

Nagwani et al, "Weight similarity measurement model based, object oriented approach for bug databases mining to detect similar and duplicate bugs," Published Jan. 23, 2009, ACM Digital Library, accessed Aug. 2, 2023, https://dl.acm.org/doi/abs/10.1145/1523103.1523145.

Nguyen, "Location-aware resource allocation in mobile edge clouds," last updated Jun. 2021, Autonomous Distributed Systems Lab, Umea University, 3 pages, accessed Aug. 2, 2023, http://www.diva-portal.org/smash/record.jsf?pid=diva2%3A1520686&dswid=-4609.

Prema et al, "File Splitting and Storing In Multiple Cloud Servers for Secured Cloud Storage," International Journal of Advanced Networking & Applications (IJANA), accessed Aug. 2, 2023,https://www.ijana.in/papers/76.pdf.

Comiskey Charles. "Enhanced Data Residency, Compliance, and Security on IBM Cloud with Logging and Activity Tracking", retrieved from web https://web.archive.org/web/20220813095429/https://www.ibm.com/cloud/blog/announcements/enhanced-data-residency-compliance-and-security-on-ibm-cloud-with-logging-and-activity-tracking, Jul. 19, 2019, 7 pages.

* cited by examiner

INTELLIGENT DATA MOVEMENT FOR DATA RESIDENCY RESTRICTIONS

BACKGROUND

The disclosure relates generally to an improved computer system and more specifically to intelligently moving data to handle data residency restrictions.

Large amounts of data are generated, processed, and stored in networks, computer systems, and computing devices int different locations across the world. This data can include financial records, user information, customer lists, and other information.

Restrictions as to the location and movement of data can be present. For example, some countries and regions have implemented regulations that restrict the movement of data. Data residency restrictions can require selected types of data to remain within the boundaries of a particular country or region. These data residency restrictions are typically based on legal or regulatory requirements set by different countries, regions, or organizations. These restrictions typically are used to enforce data privacy and data security. For example, data residency restrictions can restrict the movement of confidential or critical data within the boundaries of a specific geographic location. By storing data within defined boundaries such as a country, the laws of that country can be used to protect the data and also reduce unauthorized access to the data.

SUMMARY

According to one illustrative embodiment, a computer implemented method is provided for managing data in a mobile computing device. A number of processor units determine a geographic location of a mobile computing device. The number of processor units predict a predicted data residency issue with meeting data residency requirements for data stored in the mobile computing device based on the geographic location of the mobile computing device and a set of movement patterns for the mobile computing device. The number of processor units identify a number of recipient devices that meet the data residency requirements for moving the data from the mobile computing device to the number of recipient devices in response to predicting the predicted data residency issue. The number of processor units move the data to the number of recipient devices from the mobile computing device in response to identifying the number of recipient devices. According to other illustrative embodiments, a computer system and a computer program product for managing data in a mobile computing price are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
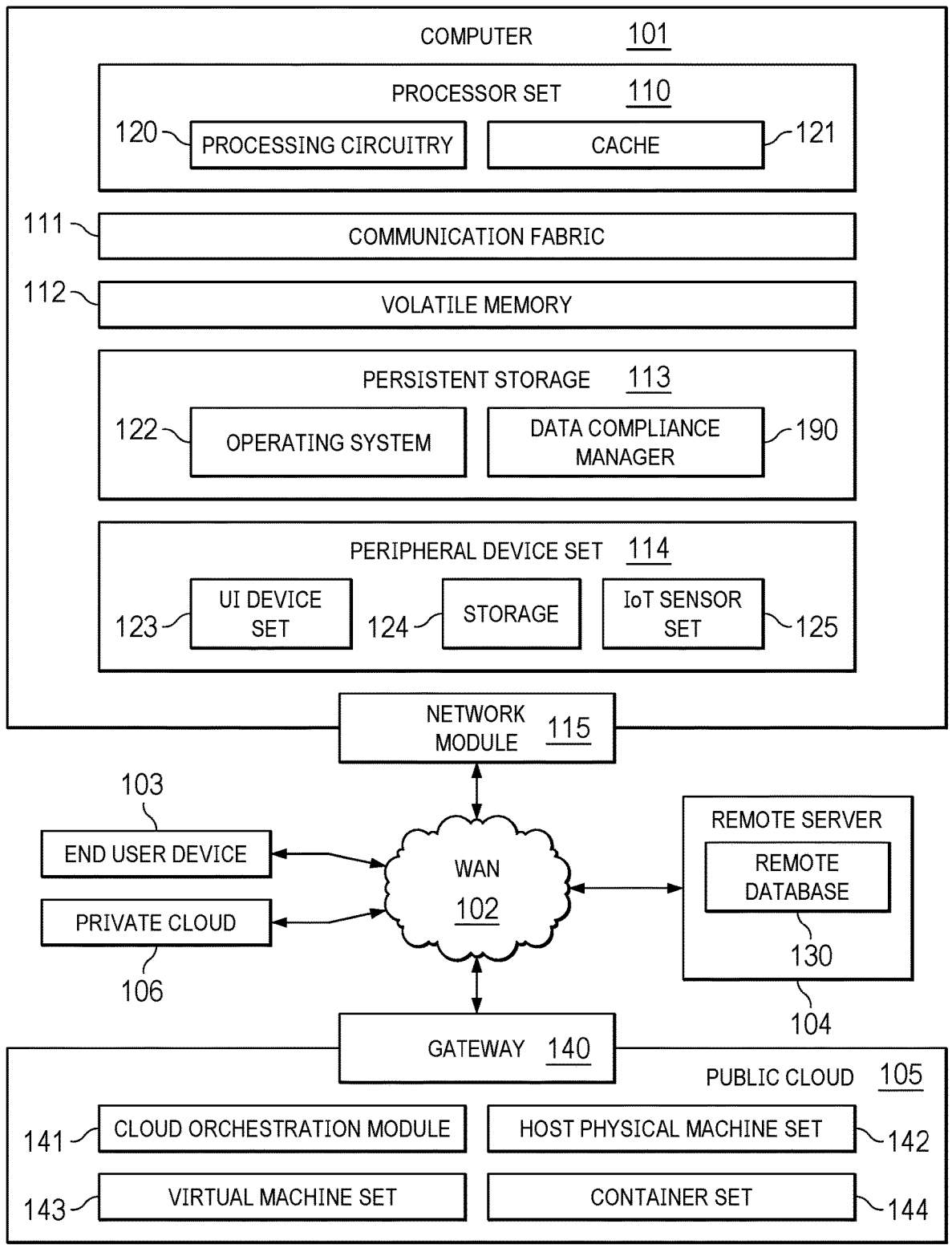
FIG. 1 is a block diagram of a computing environment in accordance with an illustrative embodiment.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as data compliance manager 190. In addition to data compliance manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data compliance manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in data compliance manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in data compliance manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, data residency restrictions can pose challenges for different businesses or organizations including cloud service providers that operate across different countries. For example, a cloud service provider manages data storage and processing to comply with data restrictions while still providing services with a desired level of performance.

Heterogeneous nodes such as far edge and near edge devices are considered weak links in cloud computing with respect to security and compliance with data residency restrictions. The difficulties of meeting data residency restrictions increase when these devices are mobile. For example, a mobile computing device such as a mobile phone, a vehicle, or laptop can move from point A to point B. If this movement the data a boundary, the data residency restrictions may restrict the movement of data from point A to point B. Further, depending on the type of data located in the mobile computing device, the movement from point A to point B can unknowingly violate data residency restrictions. These types of events can result in unnecessary costs such as fines and penalties for movement of the data that violates data residency restrictions.

Thus, illustrative embodiments provide a computer implemented method, apparatus, computer system, and computer program products for managing data. In particular, the different illustrative examples can manage data in a manner that avoids data residency issues from violating data residency restrictions.

In one illustrative example, a computer implemented method is provided to manage data in a mobile computing device. A number of processor units determine a geographic location of a mobile computing device. The number of processor units predict a predicted data residency issue with meeting data residency requirements for data stored in the mobile computing device based on the geographic location of the mobile computing device and a set of movement patterns for the mobile computing device. The number of processor units identify a number of recipient devices that meet the data residency requirements for moving the data from the mobile computing device to the number of recipient devices in response to predicting the predicted data residency issue. The number of processor units move the data to the number of recipient devices from the mobile computing device in response to identifying the number of recipient devices.

As used herein, a "number of" when used with reference to items means a group of one or more items. For example, a number of processor units is one or more processor units.

Figure 2:
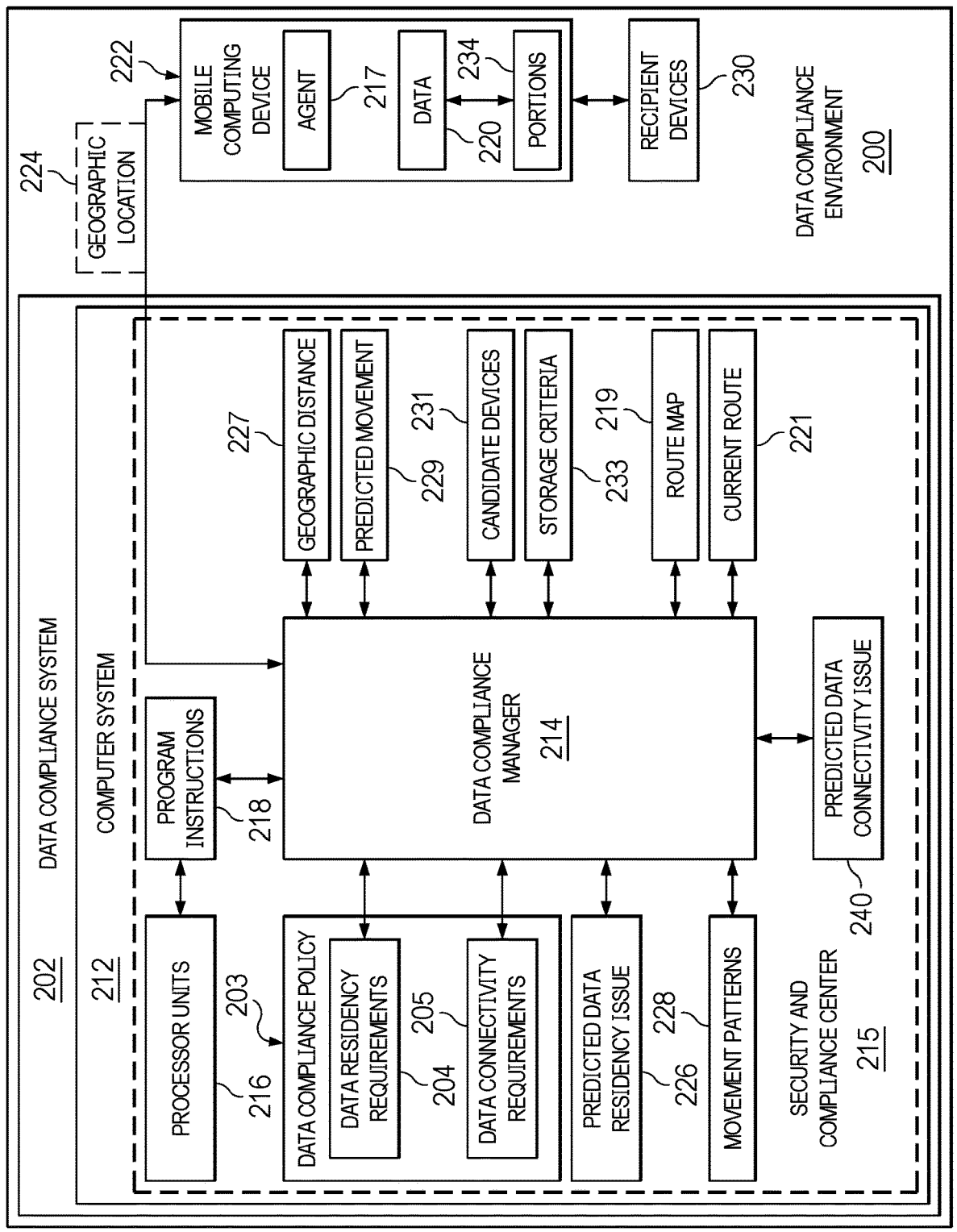
FIG. 2 is a block diagram of a data management environment in accordance with an illustrative embodiment.

With reference now to FIG. 2, a block diagram of a data management environment is depicted in accordance with an illustrative embodiment. In this illustrative example, data compliance environment 200 includes components that can be implemented in hardware such as the hardware shown in computing environment 100 in FIG. 1. Data compliance manager 214 may be implemented using data compliance manager 190 in FIG. 1.

In this illustrative example, data compliance system 202 manages data within data compliance environment 200. This management of data includes that at least one of data generation, data transfer, data processing, or data storage occurs in a manner that meets data compliance policy 203. Data compliance policy 203 can include at least one of data residency requirements 204, data connectivity requirements 205, or other requirements describing the manner in which data is to be handled.

In this example, data compliance system 202 comprises computer system 212 and data compliance manager 214. Data compliance manager 214 is located in computer system 212. In this example, data compliance manager 214 can be located in security and compliance center 215 in computer system 212.

Data compliance manager 214 can be implemented in software, hardware, firmware or a combination thereof. When software is used, the operations performed by data compliance manager 214 can be implemented in program instructions configured to run on hardware, such as a processor unit. When firmware is used, the operations performed by data compliance manager 214 can be implemented in program instructions and data and stored in persistent memory to run on a processor unit. When hardware is employed, the hardware can include circuits that operate to perform the operations in data compliance manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, data compliance manager 214 manages data 220 in mobile computing device 222. Mobile computing device 222 can take a number of different forms. For example, mobile computing device 222 can be a near edge device, a far edge device, a heterogeneous node, a laptop computer, a smart phone, a smartwatch, augmented reality glasses, an augmented reality headset, a vehicle, an aircraft, or other suitable mobile computing device.

In this example, data 220 is subject to data compliance policy 203. The management of data 220 can be with respect to at least one of data residency requirements 204 or data connectivity requirements 205. Data residency requirements 204 define the management of data 220 with respect to location in these examples. In other words, data residency requirements 204 may specify that data 220 remains within some geographic boundary.

Further in this example, data connectivity requirements 205 identify requirements for managing data 220 with respect to connectivity of computing devices. These requirements may specify a particular bandwidth, connection quality, connection speed, connection latency, packet loss, signal strength, or other metric with respect to a connection for transferring data with a desired level of connectivity. Data connectivity requirements 205 can also specify restrictions on the movement or location of a computing device to ensure a desired connectivity. In other words, location and movement restrictions can be present in data connectivity requirements 205 to ensure a desired connection for the communicating data.

In one illustrative example, data compliance manager 214 determines geographic location 224 of mobile computing device 222. Geographic location 224 can be received from mobile computing device 222. Mobile computing device 222 can determine its geographic location using a global positioning system sensor or other suitable location system in mobile computing device 222.

In this example, agent 217 is a component in mobile computing device 222 communicates with data compliance manager 214. Data compliance manager 214 can send instructions and commands to agent 217 in mobile computing device 222 with respect to managing data 220 to meet data compliance policy 203.

In this illustrative example, data compliance manager 214 predicts predicted data residency issue 226 that may occur with meeting data residency requirements 204 for data 220 stored in mobile computing device 222 based on geographic location 224 of mobile computing device 222 and a set of movement patterns 228 for mobile computing device 222.

As used herein, a "set of" when used with reference items means one or more items. For example, a set of movement patterns 228 is one or more of movement patterns 228. In this example, movement patterns 228 can be determined from historical data gathered for the movement of mobile computing device 222. A movement pattern in movement patterns 228 can include a route that mobile computing device 222 travels. Additionally, the movement pattern can also include a time and day of when mobile computing device 222 travels on that route.

As part of predicting predicted data residency issue 226, data compliance manager 214 determines geographic distance 227 that mobile computing device 222 can travel and meet data residency requirements 204 for data 220. Data compliance manager 214 predicts a predicted movement 229 of mobile computing device 222 using geographic location 224 and the set of movement patterns 228. Data compliance manager 214 can also use geographic distance 227 in making this prediction. Data compliance manager 214 predicts predicted data residency issue 226 using predicted movement 229 of mobile computing device 222 and geographic distance 227. Predicted movement 229 can take the form of a route or path of movement that is predicted for mobile computing device 222.

Data compliance manager 214 identifies a number of recipient devices 230 that meet data residency requirements 204 for moving data 220 from mobile computing device 222 to the number of recipient devices 230 in response to data compliance manager 214 predicting predicted data residency issue 226. In this example, recipient devices 230 can be devices that mobile computing device 222 can connect to for uploading data 220.

For example, data compliance manager 214 can use movement patterns 228 to identify a route map 219 containing current route 221 for mobile computing device 222. With current route 221, data compliance manager 214 can identify recipient devices 230 that can be reached or connected to by mobile computing device 222 alone current route 221.

As part of identifying the number of recipient devices 230, data compliance manager 214 identifies devices meeting data residency requirements 204 to form candidate devices 231. Data compliance manager 214 determines which ones of candidate devices 231 meet storage criteria 233 for storing the data 220 to identify the number of recipient devices 230. In other words, sufficient available storage space is needed in the number of recipient devices 230. Further, storage criteria 233 can also include formatting, security measures, and other criteria relating to storing data.

Recipient devices 230 can take a number of different forms. For example, recipient devices 230 can be selected from at least one of a heterogeneous node, a far edge device, a near edge device, a mobile computing device, a server computer, a storage system, a storage device in a data center, or some other suitable type of device. For example, recipient devices 230 can be multiple devices in a data center. In another example, a recipient device can be a server computer or another mobile computing device. In yet other illustrative examples, a data center can also be considered a recipient device.

Data compliance manager 214 moves data 220 to the number of recipient devices 230 from mobile computing device 222 in response to identifying the number of recipient devices 230. In this example, data 220 can be moved to at least one of the number of recipient devices 230.

In this example, the movement of data 220 to the number of recipient devices 230 can be performed in response to an inability of mobile computing device 222 to transfer data 220 to another location that mobile computing device 222 normally uses to back up data 220 such as a central cloud. In other words, the number of recipient devices 230 are used as a backup in case mobile computing device 222 will violate data residency requirements 204 prior to being able to send data 220 to the location normally designated for storing data 220.

In this illustrative example, moving data 220 to the number of recipient devices 230 can take a number of different forms. For example, all of data 220 can be sent to a particular recipient device in the number of recipient devices 230. In another example, data 220 can be sent in portions 234 to two more of the number of recipient devices 230 when a number of recipient devices 230 comprises two or more recipient devices.

In this illustrative example, the splitting of data 220 into portions 234 can be performed when mobile computing device 222 is unable to transfer all of data 220 to a single recipient device before predicted data residency issue 226 occurs. In other words, mobile computing device 222 is predicted to cross a boundary prior to being able to transfer all of data 220 into a single recipient device.

Data compliance manager 214 can split data 220 into portions 234 for movement in response to an inability to send data 220 to a single recipient device in the number of recipient devices 230 prior to predicted data residency issue 226 occurring. Data compliance manager 214 can move portions 234 of data 220 to the number of recipient devices 230.

For example, data 220 in mobile computing device 222 can have a size of 1 TB. Based on the route and speed of mobile computing device 222, mobile computing device 222 may only be able to send 500 GB of data 220 to a single recipient device. As a result, data compliance manager 214 can identify an alternate or backup plan for transferring all of data 220. For example, data compliance manager 214 may have mobile computing device 222 send 500 GB of data to one recipient device in the number of recipient devices 230 and send 500 GB of data to a second recipient device in the number of recipient devices 230. As a result, predicted data residency issue 226 can be avoided.

In this illustrative example, the splitting of data 220 into portions 234 and movement of portions 234 can be performed by data compliance manager 214 sending instructions to mobile computing device 222. If, however, all of data 220 cannot be sent to the number of recipient devices 230 even with splitting data 220 into portions 234, data compliance manager 214 can calculate and suggest a new route for mobile computing device 222 that enables moving data 220 without encountering predicted data residency issue 226.

In another illustrative example, data compliance manager 214 can manage data 220 for mobile computing device 222 with respect to data connectivity requirements 205. For example, data compliance manager 214 predicts predicted data connectivity issue 240 with meeting data connectivity requirements 205 for data 220. Data compliance manager 214 identifies a group of recipient devices 230 for moving data 220 from mobile computing device 222 to the group of recipient devices 230 in response to predicting predicted data connectivity issue 240. In this illustrative example, predicted data connectivity issues 240 are selected from at least one of the geographic location, an amount of movement of mobile computing device 222, the amount of movement of mobile computing device 222 on a particular time and day, a connection quality; a connection speed, connection latency, a packet loss, a signal strength, or other issue relating to connectivity in transferring data 220.

Data compliance manager 214 moves data 220 to the group of recipient devices 230 from mobile computing device 222 in response to identifying the number of recipient devices 230. As used herein, "a group of" when used with reference items means one or more items. For example, a group of recipient devices 230 is one or more of recipient devices 230. In this example, the group of recipient devices 230 can be a different selection of recipient devices as compared to number of recipient devices 230.

In these illustrative examples, data 220 can be moved back or restored to mobile computing device 222 when mobile computing device 222 complies with the applicable data compliance policy such as data residency requirements 204 or data connectivity requirements 205.

In one illustrative example, one or more solutions are present that overcome a problem with violations of data residency requirements that can occur from movement of mobile computing devices. As a result, one or more solutions may provide an ability to reduce or avoid violating data residency requirements that occur from movements of mobile computing devices. In the different illustrative examples, data can be transferred from those mobile computing devices prior to a data residency issue occurring. The data can then be transferred back to the mobile computing devices once the mobile computing devices have moved to place where a violation would not be present for the data.

In the illustrative example, the use of data compliance manager 214 in computer system 212 integrates processes into a practical application for managing data in a mobile computing device. In this illustrative example, data compliance manager 214 can manage data 220 for mobile computing device 222 in a manner that increases the ability to avoid data compliance issues in data compliance environment 200. As a result, unnecessary penalties and fines for violating data residency requirements can be reduced or avoided.

Data compliance manager 214 in computer system 212 is directed to a practical application of processes integrated into data compliance manager 214 in computer system 212 that predicts a predicted data residency issue with meeting data residency requirements for the data stored in a mobile computing device. Candidate devices can be evaluated to determine recipient devices to receive the data from the mobile computing device. This data can be restored to the mobile computing device at a later time when the mobile computing device is no longer predicted to have data residency compliance issues. A similar process can be performed to manage the data in a mobile computing device to meet data connectivity requirements.

The illustration of data compliance environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a central cloud, data center, or server can be present that is normally used to store data 220. Mobile computing device 222 can attempt to transfer data to the designated storage location and the identification and movement of data 220 to a number of recipient devices 230 can be performed in response to an inability to move data 220 to the designated location. As another example, computer system 212 with data compliance manager 214 in security compliance center 215 can be implemented in a network, a cloud environment, or some other computing platform. Further, mobile computing device 222 may also store data other than data 220. This other data may not be subject to the same data compliance policy.

Figure 3:
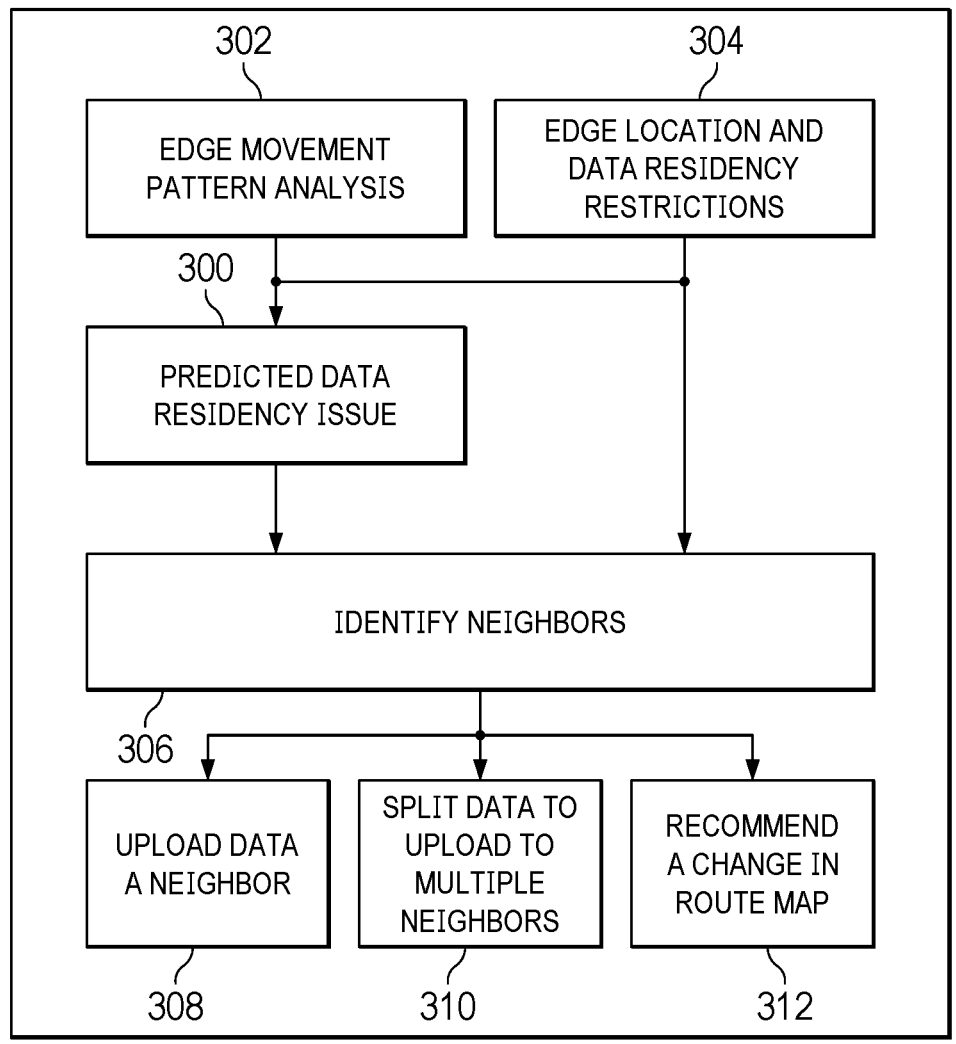
FIG. 3 is a dataflow diagram for an intelligent backup of data in a mobile edge device in accordance with an illustrative embodiment.

With reference next to FIG. 3, a dataflow diagram for an intelligent backup of data in a mobile edge device is depicted in accordance with an illustrative embodiment. In this example, the dataflow can be performed by a data compliance manager such as data compliance manager 214 in FIG. 2. In this illustrative example, predicted data residency issue 300 can be predicted for a mobile edge device using edge movement pattern analysis 302 and edge location and data residency restrictions 304.

In this example, edge movement pattern analysis 302 is performed using a set of movement patterns identified for the mobile edge device and the current location of the mobile edge device. Edge movement pattern analysis 302 identifies movement in the form of a route map for the mobile edge device. The route map is the route that the mobile edge device is predicted or expected to take as identified in edge movement pattern analysis 302.

Edge location and data residency restrictions 304 can be received from a security and compliance center such as security compliance center 215 in FIG. 2. Edge location and data residency restrictions 304 identify restrictions on where data can be located. These restrictions can include at least one of where data needs to remain and the type of data that is covered by the restrictions.

In this example, with predicted data residency issue 300, neighbors are identified in block 306. In this example, a neighbor is a device or system that has available storage and also needs other criteria for storage. This other criterion storage can include encryption, security level, or other criteria. In this example, a neighbor is an edge device, cloud, data center, or other computing device or system that can receive data from the edge device predicted to have predicted data residency issue 300. In other words, the mobile edge device can offload data to any of the one or more of the neighbors identified. In this example, the offloading is an intelligent backup such that the data can be backed up or stored while the mobile edge device is in a location where the data cannot be located.

Further, several options can be present with respect to offloading and backing up the data in response to predicted data residency issue 300 being present. For example, the data can be uploaded to a neighbor in block 308. In another example, the route on which the mobile edge device is moving may not allow for uploading all of the data to a single neighbor before the mobile edge device moves outside of a boundary resulting in a data residency restriction. In this case, the data can be split to upload to multiple neighbors in block 310. In another example, if an inability is present to upload all of the data or neighbors are not identified in block 306, a change in the route map can be recommended for the mobile edge device in block 312. In other words, the recommendation to change route of the edge device can be made such that sufficient time is present to upload the data to multiple neighbors. Alternatively, the recommendation of the route map change may be made such that the mobile edge device can have connectivity or time to upload the data to neighbors identified in block 306.

Figure 4:
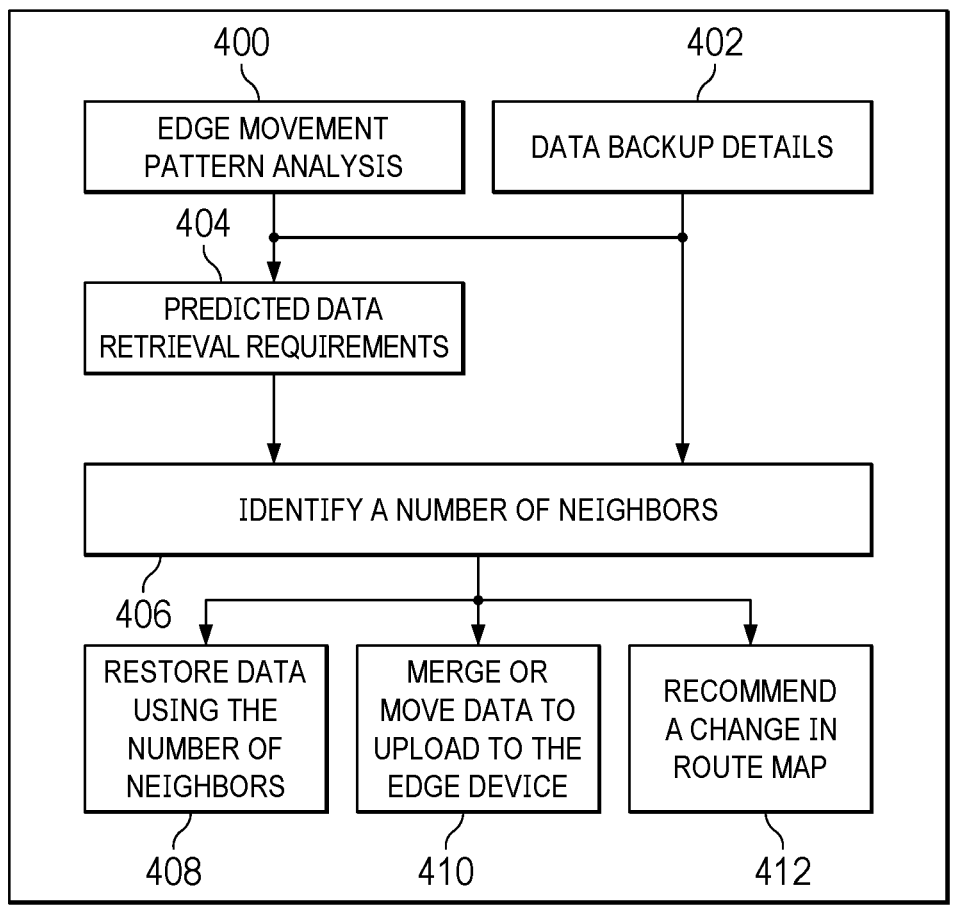
FIG. 4 is a dataflow diagram for an intelligent restore of data to a mobile edge device in accordance with an illustrative embodiment.

Turning next to FIG. 4, a dataflow diagram for an intelligent restore of data to a mobile edge device is depicted in accordance with an illustrative embodiment. In this example, data was intelligently backed up from a mobile edge device using the dataflow in FIG. 3. Based on the movement of the mobile edge device, the data can be restored as shown in this dataflow diagram when data residency restrictions can be met based on the location and movement of the mobile edge device.

In this illustrative example, edge movement pattern analysis 400 and data backup details 402 can be used to determine predicted data retrieval requirements 404 for the mobile edge device. In this example, edge movement pattern analysis 400 can be used to determine a route map for the mobile edge device. In other words, the route map can be a prediction of the route that the mobile edge device takes when the mobile edge device is at a location or within an area meeting data residency requirements. In this example, data backup details are details of the data backed up from the mobile edge device. These details can include the amount of data and the neighbors storing the uploaded data from the edge device in performing the intelligent backup.

The process identifies a number of neighbors that can be used to restore the data to the mobile edge device in block 406. For example, when the number of neighbors identified are the same number of neighbors that have the backed up data, the data can be restored using the number of neighbors in block 408.

In some cases, the mobile edge device returns to a location or area that needs data residency requirements using different routes. In this case, the number of neighbors may be different from the number of neighbors used to back up the data. In this case, the data can be merged or moved to the number of neighbors identified to upload to the edge device in block 410. In this example, the data can be merged or moved to the number of neighbors that will be sufficiently close to the route for the mobile edge device such that the data can be uploaded to the mobile device from the number of neighbors identified.

In other illustrative examples, the number of neighbors that can upload data to the mobile edge device may not be reachable by the mobile edge device. In this case, a change in the route map for the mobile edge device is recommended in block 412. This recommendation can change the route of the mobile edge device such that the mobile edge device can receive data backed up by the number of neighbors.

Figure 5:
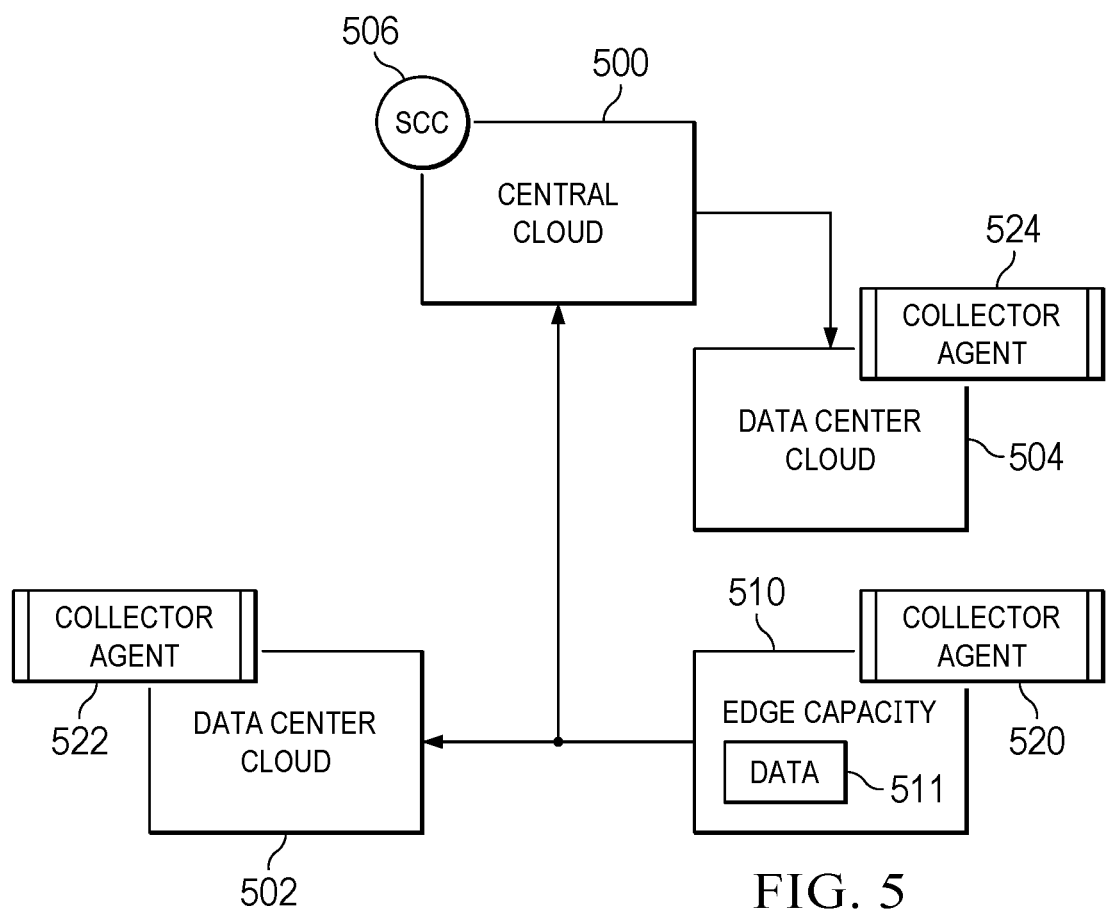
FIG. 5 is an illustration of dataflow in a data compliance environment in accordance with an illustrative embodiment.

Turning now to FIG. 5, an illustration of dataflow in a data compliance environment is depicted in accordance with an illustrative embodiment. In this example, central cloud 500, data center cloud 502, and data center cloud 504 are components in a distributed cloud system. Data center cloud 502 and data center cloud 504 are sub clouds to central cloud 500.

In this example, security and compliance center (SCC) 506 contains data compliance policies such as data residency requirements and data connectivity requirements. SCC 506 is an example of security compliance center 215 in FIG. 2. Further, SCC 506 can also have a mapping of the current geographic location to data residency location and region. Data residency location and region defines where data should remain to comply with data residency requirements.

In this illustrative example, edge capacity 510 is an edge device in the form of a mobile computing device. In this example, edge capacity 510 stores data 511. Further, in this example, SCC 506 is in central cloud 500. In this example, edge capacity 510 can move along different routes. SCC 506 can track this movement and generate movement patterns for edge capacity 510. These movement patterns can be in the form of route maps that define the routes that edge capacity 510 takes. Further, these movement patterns include information about when these movement patterns occur.

In this illustrative example, collector agent 520 in edge capacity 510, collector agent 522 in data center cloud 502, and collector agent 524 in data center cloud 504 are agents that collect compliance data and security data. This information is sent to SCC 506.

The compliance data can be, for example, the type of data and the location of a component. Further, the compliance data can also include routes used by a component such as edge capacity 510. Other information that can be collected by these collector agents as compliance data include reachability, availability, upload capability, download capability, and mobility.

In this example, the security data collected by the collector agents can include information about security controls for data such as data 511 located in edge capacity 510. These security controls can include at least one of encryption, access controls, firewalls, intrusion detection systems, virtual private networks, encrypted connections, or other controls for protecting data.

SCC 506 can manage data residency for data 511 in edge capacity 510. SCC 506 can determine predicted data residency issues based on the movement and movement patterns for edge capacity 510. In this example, the movement patterns can be used to determine a route map containing the route on which edge capacity 510 is moving.

When a predicted data residency issue is predicted for data 511 in edge capacity 510, intelligent data movement can be performed with neighboring components. For example, edge capacity 510 can attempt to upload data 511 to the central cloud 500. However, edge capacity 510 often has limited connectivity or bandwidth for uploading data to components such as central cloud 500.

If central cloud 500 cannot receive the data, SCC 506 can identify other components to receive data 511. For example, SCC 506 can identify data center cloud 502 as a candidate for which data 511 can be uploaded to avoid a data residency issue for edge capacity 510. This determination can be made by identifying other cloud capacities that edge capacity 510 can connect to based on the route map for edge capacity 510. In other words, the route in the route map can be used to identify other cloud capacities that edge capacity 510 can connect to and have sufficient bandwidth to upload data 511. In this example, a cloud capacity refers to a cloud component that has capacity or space to store data.

In this example, SCC 506 recommends uploading data 511 to data center cloud 502. In this example, SCC 506 takes into account the security at candidate cloud capacities as well as determining whether the candidate cloud capacities can be connected to edge capacity 510. For example, data center cloud 504 does not have the same encryption level as edge capacity 510, data center cloud 504 is not used as a recipient to receive data 511. In this manner, edge capacity 510 can continue on its route after uploading data 511, avoiding data residency issues.

In this illustrative example, when data 511 is uploaded to data center cloud 502, data center cloud 502 can transfer or move this data to central cloud 500.

In some cases, data 511 may need to be split and sent to multiple cloud capacities. For example, if data 511 is 1 TB, based on the route map and current speed of edge capacity 510, edge capacity 510 may only be able to back up 500 GB of data 511 to data center cloud 502 before a data residency issue occurs. In this case, SCC 506 can recommend splitting data 511 with 500 GB of data 511 being sent to data center cloud 502 and another 500 GB of data 511 being sent to data center cloud 504. In this illustrative example, although data 511 is uploaded in portions to different cloud capacities, these portions can be merged into a single cloud capacity such as central cloud 500 or data center cloud 504.

With respect to merging data 511, the selection of a particular cloud capacity by SCC 506 can be based on the movement pattern of edge capacity 510. The movement pattern may indicate that edge capacity 510 is a route map that will enable for restoring data 511 to edge capacity 510 from data center cloud 504. In this case, the portion of data 511 stored in data center cloud 502 can be merged with the portion of data 511 stored in data center cloud 504.

In one illustrative example, based on the route of edge capacity 510, SCC 506 may predict that in two hours, edge capacity 510 will return to location where data 511 can be restored to edge capacity 510. In this case, data 511 may need to be retrieved from any locations where data 511 is stored. SCC 506 can inform cloud capacity storing portions of data 511 to process and have data 511 ready to restore to edge capacity 510.

In another example, SCC 506 can determine that different cloud capacities will be present for restoring data 511 other than those storing data 511 when edge capacity 510 is no longer in a location where a data residency issue is present for data 511. In this case, SCC 506 can send a request to the cloud capacity storing the data to forward the data to other cloud capacities that will be on the path of edge capacity 510.

In the instance in which a candidate cloud capacity cannot be identified by SCC 506 for uploading data 511, SCC 506 can recommend route change to edge capacity 510. This route change can enable edge capacity 510 to connect to a cloud capacity to upload data 511. In this example, the route comprises a path and a speed of edge capacity 510. The change in the route can include a change in at least one of the path or speed of edge capacity 510.

Further, in some cases it may not be possible to upload data 511 to another location prior to edge capacity 510 moving across the border or to a location where a data residency issue occurs. In this case, SCC 506 may send a warning or indication that data 511 is at risk of a data residency violation because a backup is not available to upload data 511.

Figure 6:
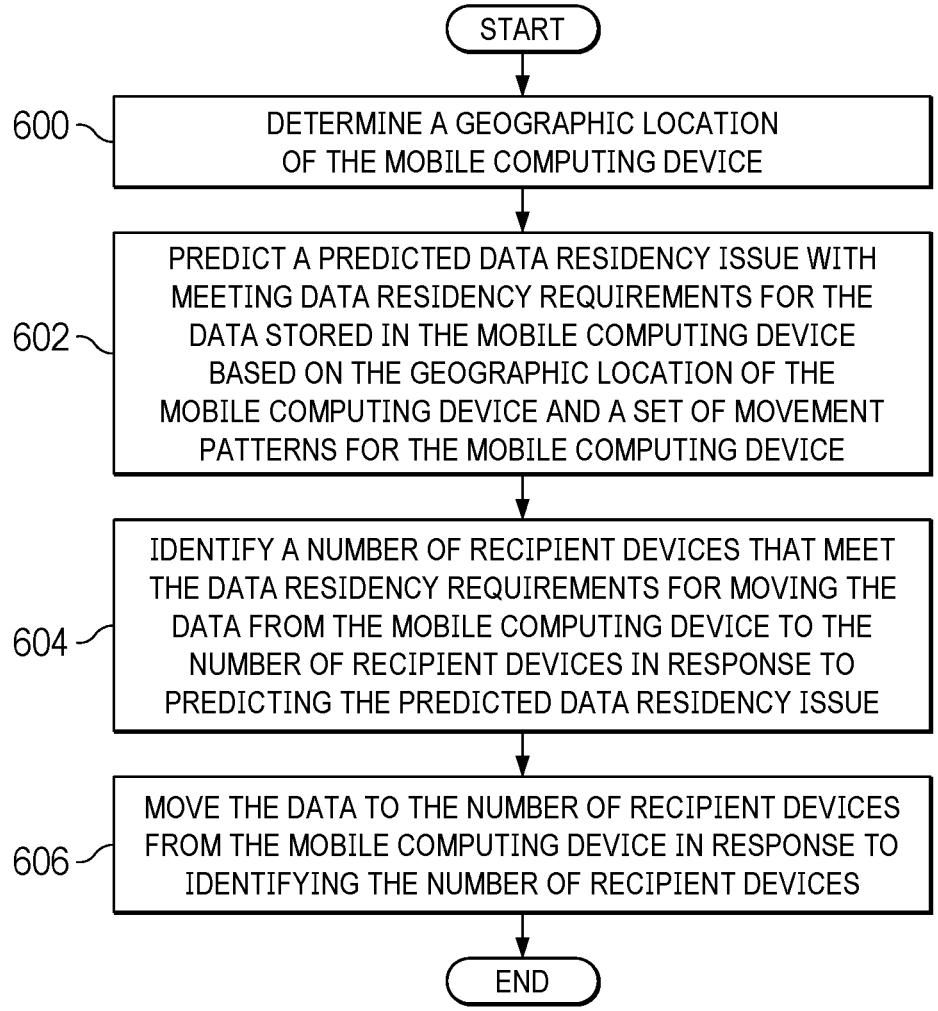
FIG. 6 is a flowchart of a process for managing data in a mobile computing device in accordance with an illustrative embodiment.

Turning next to FIG. 6, a flowchart of a process for managing data in a mobile computing device is depicted in accordance with an illustrative embodiment. The process in FIG. 6 can be implemented in hardware, software, or both. When implemented in software, the process can take the form of program instructions that are run by one of more processor units located in one or more hardware devices in one or more computer systems. For example, the process can be implemented in data compliance manager 214 in computer system 212 in FIG. 2.

The process begins by determining a geographic location of the mobile computing device (step 600). The process predicts a predicted data residency issue with meeting data residency requirements for the data stored in the mobile computing device based on the geographic location of the mobile computing device and a set of movement patterns for the mobile computing device (step 602). In step 602, the process determines a route map for the mobile computing device based on the set of movement patterns and the current geographic location of the mobile computing device. The route map includes a predicted route for the mobile computing device which is used to determine whether the movement of the mobile computing device will result in a data residency issue with the data stored in the mobile computing device.

The process identifies a number of recipient devices that meet the data residency requirements for moving the data from the mobile computing device to the number of recipient devices in response to predicting the predicted data residency issue (step 604). The process moves the data to the number of recipient devices from the mobile computing device in response to identifying the number of recipient devices (step 606). The process terminates thereafter.

Figure 7:
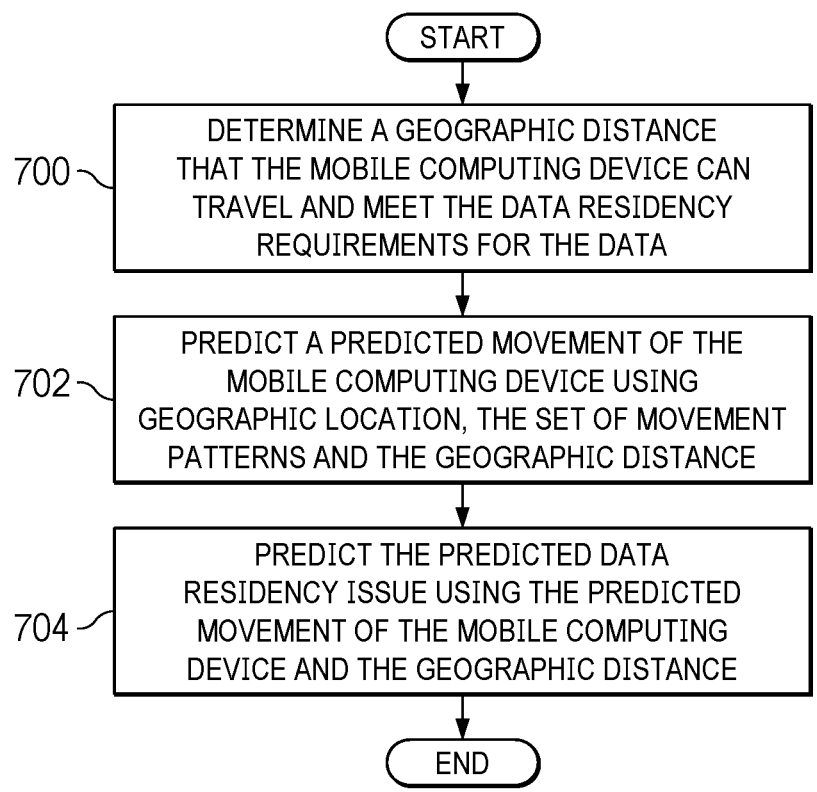
FIG. 7 is a flowchart of a process for predicting a residency issue in accordance with an illustrative embodiment.

In FIG. 7, a flowchart of a process for predicting a residency issue is depicted in accordance with an illustrative embodiment. The process in this figure is an example of an implementation for step 602 in FIG. 6.

The process determines a geographic distance that the mobile computing device can travel and meet the data residency requirements for the data (step 700). The process predicts a predicted movement of the mobile computing device using geographic location, the set of movement patterns, and the geographic distance (step 702). In step 702, the prediction can be a predicted route for the mobile computing device.

The process predicts the predicted data residency issue using the predicted movement of the mobile computing device and the geographic distance (step 704). The process terminates thereafter.

Figure 8:
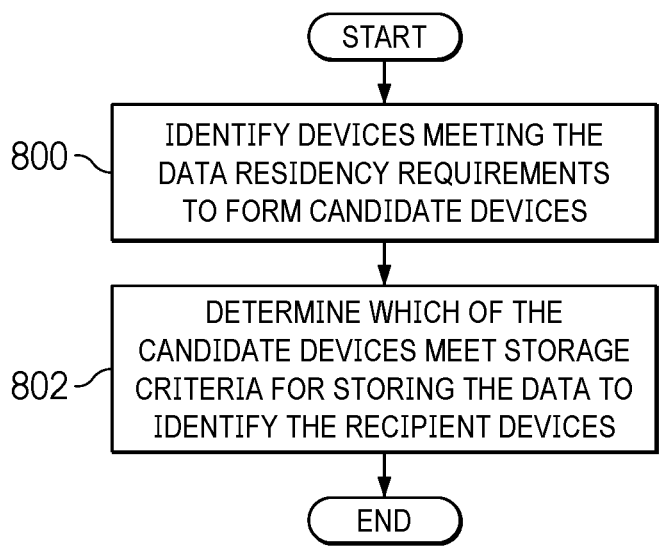
FIG. 8 is a flowchart of a process for identifying a number of recipient devices in accordance with an illustrative embodiment.

Turning to FIG. 8, a flowchart of a process for identifying a number of recipient devices is depicted in accordance with an illustrative embodiment. The process in this figure is an example of an implementation of step 604 in FIG. 6.

The process identifies devices meeting the data residency requirements to form candidate devices (step 800). The process determines which of the candidate devices meet storage criteria for storing the data to identify the recipient devices (step 802). The process terminates thereafter. In step 802, this determination results in the identification of the number of recipient devices.

Figure 9:
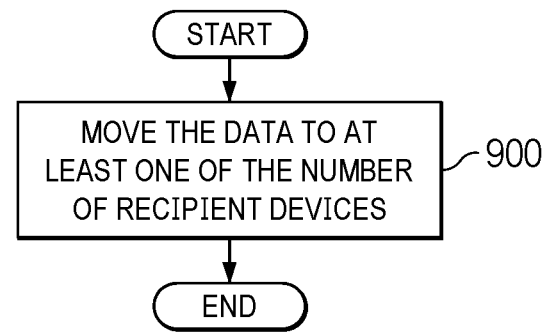
FIG. 9 is a flowchart of a process for moving data to a number of recipient devices in accordance with an illustrative embodiment.

With reference next to FIG. 9, a flowchart of a process for moving data to a number of recipient devices is depicted in accordance with an illustrative embodiment. The process in this flowchart is an example of an implementation for step 606 in FIG. 6.

The process moves the data to at least one of the number of recipient devices (step 900). The process terminates thereafter. In this step, the data can be moved to one or more of the number of recipient devices. In other words, the data does not necessarily need to be moved or uploaded to all of the number of recipient devices identified.

Figure 10:
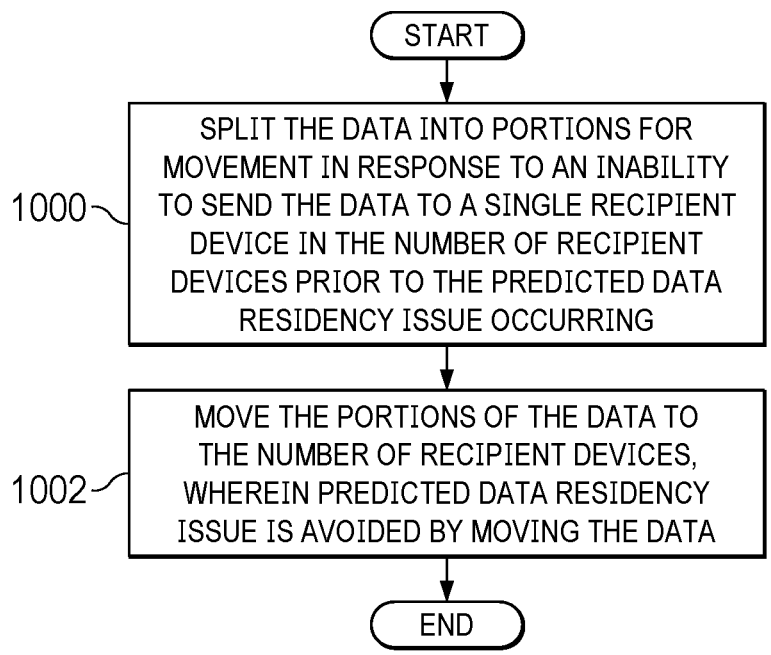
FIG. 10 is a flowchart of a process for moving data to a number of recipient devices in accordance with an illustrative embodiment.

With reference now to FIG. 10, a flowchart of a process for moving data to a number of recipient devices is depicted in accordance with an illustrative embodiment. The process in this flowchart is an example of an implementation for step 606 in FIG. 6.

The process splits the data into portions for movement in response to an inability to send the data to a single recipient device in the number of recipient devices prior to the predicted data residency issue occurring (step 1000).

The process moves the portions of the data to the number of recipient devices, wherein the predicted data residency issue is avoided by moving the data (step 1002). The process terminates thereafter.

Figure 11:
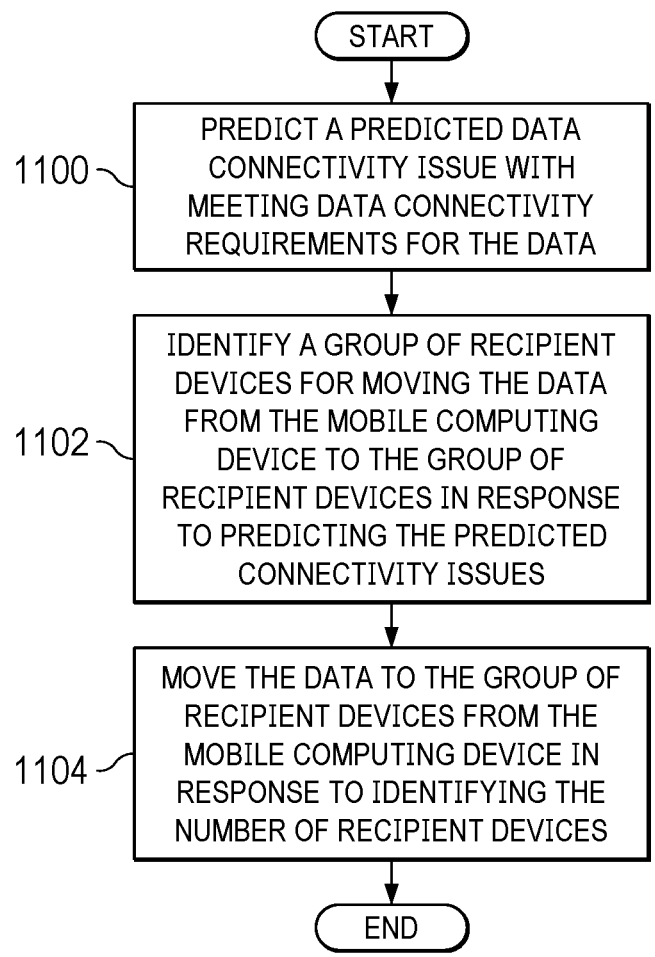
FIG. 11 is a flowchart of a process for managing data and mobile computing devices in accordance with an illustrative embodiment.

Turning to FIG. 11, a flowchart of a process for managing data and mobile computing devices is depicted in accordance with an illustrative embodiment. The process in FIG. 11 can be implemented in hardware, software, or both. When implemented in software, the process can take the form of program instructions that are run by one of more processor units located in one or more hardware devices in one or more computer systems. For example, the process can be implemented in data compliance manager 214 in computer system 212 in FIG. 2.

The process predicts a predicted data connectivity issue with meeting data connectivity requirements for the data (step 1100). In step 1100, the predicted connectivity issues can be selected from at least one of the geographic location, an amount of movement of the mobile computing device, the amount of movement of the mobile computing device on a particular time and day, a connection quality, a connection speed, connection latency, a packet loss, or a signal strength.

The process identifies a group of recipient devices for moving the data from the mobile computing device to the group of recipient devices in response to predicting the predicted connectivity issues (step 1102).

The process moves the data to the group of recipient devices from the mobile computing device in response to identifying the number of recipient devices (step 1104). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 12:
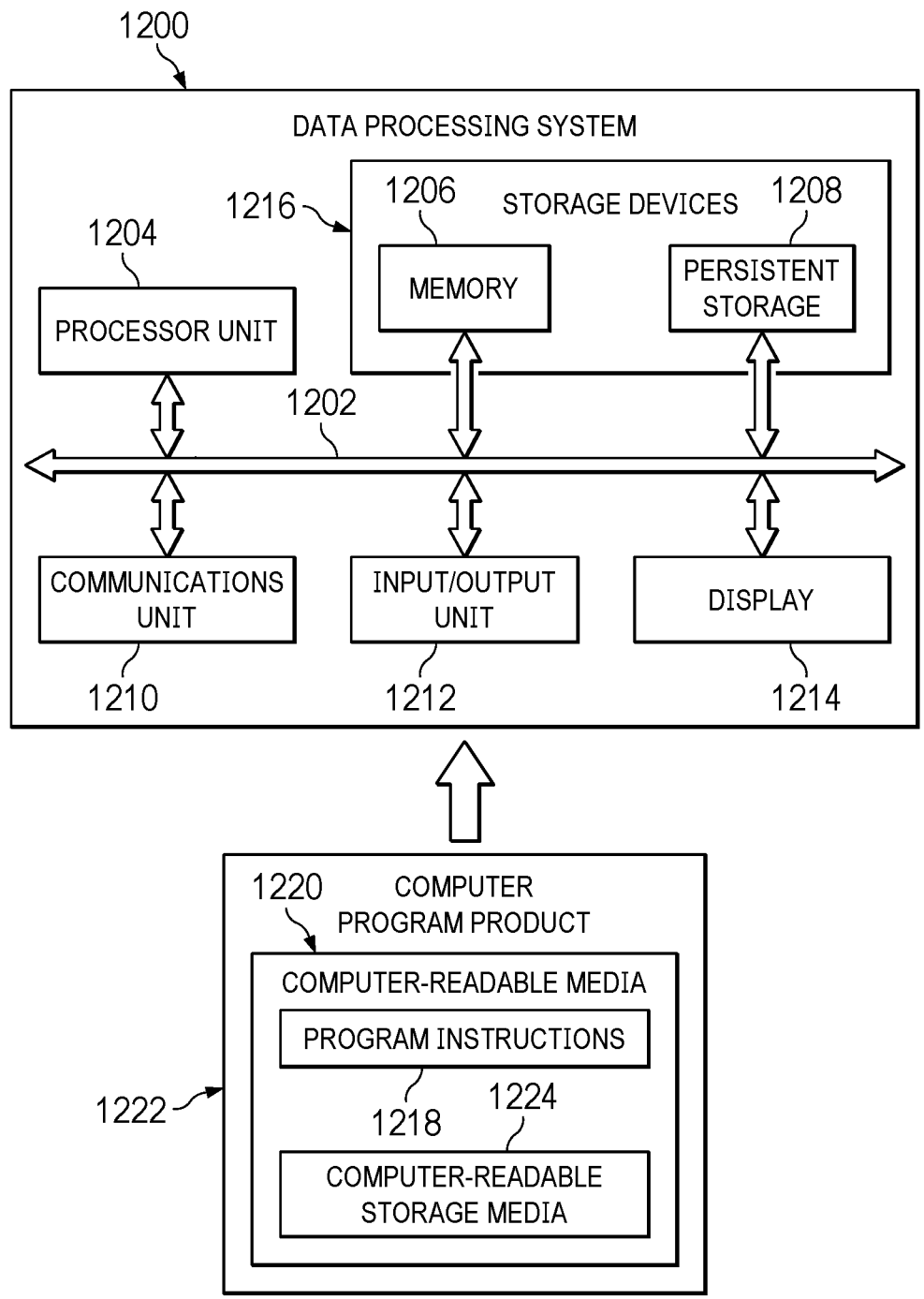
FIG. 12 is a block diagram of a data processing system in accordance with an illustrative embodiment.

Turning now to FIG. 12, a block diagram of a data processing system is depicted in accordance with an illustrative embodiment. Data processing system 1200 can be used to implement computers and computing devices in computing environment 100 in FIG. 1. Data processing system 1200 can also be used to implement computer system 212 in FIG. 2. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1216 may also be referred to as computer readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program instructions, computer usable program instructions, or computer readable program instructions that can be read and executed by a processor in processor unit 1204. The program instructions in the different embodiments can be embodied on different physical or computer readable storage media, such as memory 1206 or persistent storage 1208.

Program instructions 1218 are located in a functional form on computer readable media 1220 that is selectively removable and can be loaded onto or transferred to data processing system 1200 for execution by processor unit 1204. Program instructions 1218 and computer readable media 1220 form computer program product 1222 in these illustrative examples. In the illustrative example, computer readable media 1220 is computer readable storage media 1224.

Computer readable storage media 1224 is a physical or tangible storage device used to store program instructions 1218 rather than a medium that propagates or transmits program instructions 1218. Computer readable storage media 1224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1218 can be transferred to data processing system 1200 using a computer readable signal media. The computer readable signal media are signals and can be, for example, a propagated data signal containing program instructions 1218. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1220" can be singular or plural. For example, program instructions 1218 can be located in computer readable media 1220 in the form of a single storage device or system. In another example, program instructions 1218 can be located in computer readable media 1220 that is distributed in multiple data processing systems. In other words, some instructions in program instructions 1218 can be located in one data processing system while other instructions in program instructions 1218 can be located in one data processing system. For example, a portion of program instructions 1218 can be located in computer readable media 1220 in a server computer while another portion of program instructions 1218 can be located in computer readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, may be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program instructions 1218.

Thus, illustrative embodiments provide a computer implemented method, computer system, and computer program product for managing data in a mobile computing device. In one illustrative example, a computer implemented method manages data in a mobile computing device. A number of processor units determine a geographic location of a mobile computing device. The number of processor units predict a predicted data residency issue with meeting data residency requirements for data stored in the mobile computing device based on the geographic location of the mobile computing device and a set of movement patterns for the mobile computing device. The number of processor units identify a number of recipient devices that meet the data residency requirements for moving the data from the mobile computing device to the number of recipient devices in response to predicting the predicted data residency issue. The number of processor units move the data to the number of recipient devices from the mobile computing device in response to identifying the number of recipient devices.

With one or more illustrative examples, data residency issues can be avoided for mobile computing devices. The prediction of a predicted data residency issue for a mobile computing device can be used to move data from the mobile computing device to a recipient device prior to the occurrence of the data residency issue. As a result, unintended violations of data residency requirements, fines, and penalties can be reduced or avoided. Further, this prediction of violations and movement of data can also be used to enable compliance to other types of data compliance policies. For example, the illustrative examples can be applied to data connectivity requirements for transferring data. As a result, issues with undesired connection quality or loss of connectivity by a mobile computing device when processing and transferring different types of data can be avoided.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing data in a mobile computing device, the computer implemented method comprising:
    determining, by a number of processor units, a geographic location of the mobile computing device;
    predicting, by the number of processor units, a predicted data residency issue with meeting data residency requirements for the data stored in the mobile computing device based on the geographic location of the mobile computing device and a set of movement patterns for the mobile computing device;
    identifying, by the number of processor units, a number of recipient devices that meet the data residency requirements for moving the data from the mobile computing device to the number of recipient devices in response to predicting the predicted data residency issue; and
    moving, by the number of processor units, the data to the number of recipient devices from the mobile computing device in response to identifying the number of recipient devices.

2. The computer implemented method of claim 1, moving, by the number of processor units, the data to the number of recipient devices comprises:
    splitting, by the number of processor units, the data into portions for movement in response to an inability to send the data to a single recipient device in the number of recipient devices prior to the predicted data residency issue occurring; and
    moving, by the number of processor units, the portions of the data to the number of recipient devices, wherein the predicted data residency issue is avoided by moving the data.

3. The computer implemented method of claim 1, wherein predicting, by the number of processor units, the predicted data residency issue comprises:
    determining, by the number of processor units, a geographic distance that the mobile computing device can travel and meet the data residency requirements for the data;
    predicting, by the number of processor units, a predicted movement of the mobile computing device using geographic location, the set of movement patterns, the geographic distance; and
    predicting, by the number of processor units, the predicted data residency issue using the predicted movement of the mobile computing device and the geographic distance.

4. The computer implemented method of claim 1, wherein identifying, by the number of processor units, the number of recipient devices comprises:
    identifying, by the number of processor units, devices meeting the data residency requirements to form candidate devices; and
    determining, by the number of processor units, which of the candidate devices meet storage criteria for storing the data to identify the recipient devices.

5. The computer implemented method of claim 1, wherein moving, by the number of processor units, the data to the number of recipient devices comprises:
    moving, by the number of processor units, the data to at least one of the number of recipient devices.

6. The computer implemented method of claim 1 further comprising:
    predicting, by the number of processor units, a predicted data connectivity issue with meeting data connectivity requirements for the data;
    identifying, by the number of processor units, a group of recipient devices for moving the data from the mobile computing device to the group of recipient devices in response to predicting the predicted connectivity issues; and
    moving, by the number of processor units, the data to the group of recipient devices from the mobile computing device in response to identifying the number of recipient devices.

7. The computer implemented method of claim 6, wherein the predicted connectivity issues are selected from at least one of the geographic location, an amount of movement of the mobile computing device, the amount of movement of the mobile computing device on a particular time and day, a connection quality, a connection speed, connection latency, a packet loss, or a signal strength.

8. A computer system comprising:
    a number of processor units, wherein the number of processor units executes program instructions to:
    determine a geographic location of a mobile computing device;
    predict a predicted data residency issue with meeting data residency requirements for data stored in the mobile computing device based on the geographic location of the mobile computing device and a set of movement patterns for the mobile computing device;

identify a number of recipient devices that meet the data residency requirements for moving the data from the mobile computing device to the number of recipient devices in response to predicting the predicted data residency issue; and move the data to the number of recipient devices from the mobile computing device in response to identifying the number of recipient devices.

9. The computer system of claim 8, wherein as part of moving the data to the number of recipient devices, wherein the number of processor units further executes the program instructions to:

split the data into portions for movement in response to an inability to send the data to a single recipient device in the number of recipient devices prior to the predicted data residency issue occurring; and move the portions of the data to the number of recipient devices, wherein the predicted data residency issue is avoided by moving the data.

10. The computer system of claim 8, wherein as part of predicting the predicted data residency issue, the number of processor units further executes the program instructions to:

determine a geographic distance that the mobile computing device can travel and meet the data residency requirements for the data;

predict a predicted movement of the mobile computing device using geographic location, the set of movement patterns, the geographic distance; and predict the predicted data residency issue using the predicted movement of the mobile computing device and the geographic distance.

11. The computer system of claim 8, wherein as part of identifying the number of recipient devices, the number of processor units further executes the program instructions to:

identify devices meeting the data residency requirements to form candidate devices; and determine which of the candidate devices meet storage criteria for storing the data to identify the recipient devices.

12. The computer system of claim 8, wherein as part of moving, by the number of processor units, the data to the number of recipient devices, the number of processor units further executes the program instructions to:

move the data to at least one of the number of recipient devices.

13. The computer system of claim 8, wherein the number of processor units further executes the program instructions to:

predict a predicted data connectivity issue with meeting data connectivity requirements for the data;

identify a group of recipient devices for moving the data from the mobile computing device to the group of recipient devices in response to predicting the predicted connectivity issues; and move the data to the group of recipient devices from the mobile computing device in response to identifying the number of recipient devices.

14. The computer system of claim 13, wherein the predicted connectivity issues are selected from at least one of the geographic location, an amount of movement of the mobile computing device, the amount of movement of the mobile computing device on a particular time and day, a connection quality, a connection speed, connection latency, a packet loss, or a signal strength.

15. A computer program product for managing data in a mobile computing device, the computer program product comprising a computer readable storage medium having program instructions embodied therewith, the program instructions executable by a computer system to cause the computer system to:

determine a geographic location of the mobile computing device;

predict a predicted data residency issue with meeting data residency requirements for the data stored in the mobile computing device based on the geographic location of the mobile computing device and a set of movement patterns for the mobile computing device;

identify a number of recipient devices that meet the data residency requirements for moving the data from the mobile computing device to the number of recipient devices in response to predicting the predicted data residency issue; and move the data to the number of recipient devices from the mobile computing device in response to identifying the number of recipient devices.

16. The computer program product of claim 15, wherein as part of moving the data to the number of recipient devices, the program instructions are executable by the computer system to further cause the computer system to:

split the data into portions for movement in response to an inability to send the data to a single recipient device in the number of recipient devices prior to the predicted data residency issue occurring; and move the portions of the data to the number of recipient devices, wherein the predicted data residency issue is avoided be moving the data.

17. The computer program product of claim 15, wherein as part of predicting the predicted data residency issue, the program instructions are executable by the computer system to further cause the computer system to:

determine a geographic distance that the mobile computing device can travel and meet the data residency requirements for the data;

predict a predicted movement of the mobile computing device using geographic location, the set of movement patterns, the geographic distance; and predict the predicted data residency issue using the predicted movement of the mobile computing device and the geographic distance.

18. The computer program product of claim 15, wherein as part of identifying the number of recipient devices, the program instructions are executable by the computer system to further cause the computer system to:

identify devices meeting the data residency requirements to form candidate devices; and determine which of the candidate devices meet storage criteria for storing the data to identify the recipient devices.

19. The computer program product of claim 15, wherein as part of moving the data to the number of recipient devices, the program instructions are executable by the computer system to further cause the computer system to:

move the data to at least one of the number of recipient devices.

20. The computer program product of claim 15, wherein the program instructions are executable by the computer system to further cause the computer system to:

predict a predicted data connectivity issue with meeting data connectivity requirements for the data;

identify a group of recipient devices for moving the data from the mobile computing device to the group of recipient devices in response to predicting the predicted connectivity issues; and move the data to the group of recipient devices from the mobile computing device in response to identifying the number of recipient devices.

\* \* \* \* \*